(12) United States Patent
Klement (10) Patent No.: US 8,562,400 B2
(45) Date of Patent: Oct. 22, 2013

(54) RADIANT BAFFLE/COLLECTOR FOR ROOF CONSTRUCTION AND RETROFIT

(76) Inventor: Michael Robert Klement, Ann Arbor, MI (US)

( * ) Notice: Subject to any disclaimer, the term of this patent is extended or adjusted under 35 U.S.C. 154(b) by 0 days.

(21) Appl. No.: 13/410,523

(22) Filed: Mar. 2, 2012

(65) Prior Publication Data

US 2012/0222371 A1 Sep. 6, 2012

Related U.S. Application Data (62) Division of application No. 11/837,654, filed on Aug. 13, 2007, now Pat. No. 8,137,170.

(51) Int. Cl.
E04D 13/18 (2006.01)

(52) U.S. Cl.
USPC ........... 454/365; 126/621; 454/141; 454/260; 52/99; 52/198; 52/199

(58) Field of Classification Search
USPC .................. 126/621; 52/198, 99, 199, 95, 92; 454/141, 260, 365
See application file for complete search history.

(56) References Cited

U.S. PATENT DOCUMENTS

| | | | |
|---|---|---|---|
| 2,955,063 A | 10/1960 | Driscoll | |
| 3,797,180 A | 3/1974 | Grange | |
| 4,069,628 A * | 1/1978 | Kreimer | 52/94 |
| 4,083,360 A * | 4/1978 | Courvoisier et al. | 126/621 |
| 4,096,790 A | 6/1978 | Curran | |
| 4,102,092 A | 7/1978 | Ward | |
| 4,125,971 A | 11/1978 | Ward | |
| 4,197,683 A | 4/1980 | Ward | |
| 4,201,121 A | 5/1980 | Brandenburg, Jr. | |
| 4,237,672 A | 12/1980 | Peterson | |
| 4,269,007 A | 5/1981 | Ward | |
| 4,406,095 A | 9/1983 | Slavik | |
| 4,421,203 A | 12/1983 | Bergamini | |
| 4,446,661 A | 5/1984 | Jonsson et al. | |
| 4,704,312 A | 11/1987 | Butcher | |
| 5,094,054 A | 3/1992 | Arends | |
| 5,245,804 A * | 9/1993 | Schiedegger et al. | 52/199 |
| 5,341,612 A | 8/1994 | Robbins | |
| 5,409,549 A | 4/1995 | Mori | |
| 5,596,847 A | 1/1997 | Stephenson | |
| 5,600,928 A | 2/1997 | Hess et al. | |
| 5,924,925 A * | 7/1999 | Nystrom | 454/365 |
| 6,061,973 A | 5/2000 | Accardi et al. | |
| 6,357,185 B1 | 3/2002 | Obermeyer et al. | |
| 6,754,995 B1 | 6/2004 | Davis et al. | |
| 2004/0134137 A1 | 7/2004 | Geer et al. | |
| 2005/0072072 A1 | 4/2005 | Duncan et al. | |
| 2006/0218869 A1 | 10/2006 | Ellis | |
| 2007/0094966 A1 | 5/2007 | Snyder et al. | |

* cited by examiner

*Primary Examiner* — Avinash Savani
(74) *Attorney, Agent, or Firm* — Brinks Hofer Gilson & Lione (57) ABSTRACT

A baffle system that can be used to provide ventilation to attics and roofs at the time of new roof construction or retrofit and further provides for solar thermal energy control and harvesting systems in conjunction or combination with the baffle systems. According to one embodiment, the baffle vents are made from a resilient material and are designed and configured to be flexed into a deformed shape, positioned between adjacent roof rafters and released whereupon the baffle vents become wedged between adjacent roof rafters. The baffle vents can function as radiant barriers by providing the baffle vents with a reflecting coating(s) or reflective surface(s). The baffle vents can function as radiant collectors by positioning solar thermal collectors in the air flow channels defined by the baffle vents and darkening the lower surface of the roof sheeting plane.

18 Claims, 7 Drawing Sheets

RADIANT BAFFLE/COLLECTOR FOR ROOF CONSTRUCTION AND RETROFIT

RELATED APPLICATION

This application is a divisional application of U.S. patent application Ser. No. 11/837,654, filed Aug. 13, 2007 to which priority is claimed under 35 U.S.C. §120 and of which the entire disclosure is hereby expressly incorporated by reference.

TECHNICAL FIELD

The present invention relates to the ventilation of attics and roof undersides. More particularly, the present invention relates to a baffle system that can be used to provide ventilation to attics and roofs at the time of new roof construction or retrofit and further provides for solar energy control and harvesting systems in conjunction or combination with the baffle systems.

BACKGROUND ART

It has been known to provide various forms of baffles in roofing structures to direct or channel air along the underside of the roof, usually from the soffit area of the roof upwardly into an attic space or toward vent ducts or a crest or ridge vent. Such baffle vents often are referred to as "vent chutes." The baffle vents provide barriers to separate the interior surface of the roof from the attic area and from such extraneous materials such as insulation which might be located near the underside of the roof. The baffles direct the air against the under surface of the roof thereby keeping the roof deck cooler, preventing ice damming in the winter and eliminating the build-up of attic moisture.

A major consideration in the design and manufacture of such baffle vents has been the cost of such structures. Taking into consideration the large square footage of the roofs of buildings, such as residential homes, it has been a goal to design baffle vents so that they do not add appreciably to the cost of construction. Consequently, a number of baffle vents have been fabricated extensively of foam material sheets, thin walled plastics and cardboard and have been formed to be self-supporting so that the vents can be handled and manipulated into position for attachment against the interior surface of a roof Baffle vents conventionally have either been narrow elongated structures that are configured to fit between the rafters of a roof structure, or otherwise wider structures that are configured to be laid down, beneath roof decking, and rest atop of adjacent roof rafters. When the use of foam materials was initiated in fabricating baffle vents that were configured to fit between the rafters of a roof structure, the structures originally were relatively thick and of a simple channel configuration in cross-section so as to be self-supporting. Such thick structures were relatively expensive and added appreciably to the cost of construction. A baffle vent structure of a thinner foam sheet material that includes an improved reinforced structure to prevent the vents from collapsing during shipping, handling and installation, as well as to prevent collapsing of the vents from compacted insulation which often is blown into attic areas of a building against the underside of the baffle vents is disclosed in U.S. Pat. No. 5,341,612 to Robbins.

Baffle vent structures that are designed to be positioned between the rafters of a roof typically include attaching flanges that run along the length of the baffle vent at the side edges thereof for attaching the vents to the underside or interior surface of roofs between the rafters.

In manufactured housing, the ceiling/roof structure is often assembled or manufactured "inside-out." In this process, drywall sheeting is first applied to the bottom edges of the rafters to form the inside ceiling of the housing. Insulation then is installed between the rafters on top of the drywall. The roof decking or sheeting (e.g. plywood panels) then is attached to the top edges of the rafters and, lastly, the exterior roofing (e.g. shingles) are applied to the top of the sheeting. It readily can be understood that baffle vent structures that are designed for attaching to the interior surface of the roof sheeting, are not suitable for use when the ceiling/roof structure is manufactured inside-out as described above.

There are however baffle vent structures that are designed and configured to be installed over the top edges of roof rafters. Such baffle vent structures can be wide enough to so that the transverse side edges rest on the top edges of two adjacent roof rafters or wider so as to extend and rest on the top edges of three of more roof rafters.

U.S. Pat. No. 4,406,095 to Slavik discloses an attic insulation vent that has a corrugated shape with a plurality of ribs that are designed to prevent deformation and bowing.

Various baffle vent structures are exemplified in the disclosure of U.S. Pat. Nos. 2,955,063 to Driscoll, 3,797,180 to Grande, 4,096,790 to Curran, 4,102,092 to Ward, 4,201,121 to Brandenburg, Jr., 4,237,672 to Peterson, 4,269,007 to Ward, 4,421,203 to Bergamini, 4,446,661 to Jonsson et al., 4,704,312 to Butcher, 4,977,74 to Gregory, Jr., 5,341,612 to Robbins, 5,596,847 to Stephenson, 5,600,928 to Hess et al., 6,061,973 to Accardi et al., 6,357,185 to Obermeyer et al. and 6,754,995 to Davis et al., and in U.S. Published Patent Application Nos. 2004/0134137 to Geer et al., 2005/0072072 to Duncan et al., and 2006/021886 to Ellis.

The present invention provides a baffle system that can be used to provide ventilation to attics and roofs at the time of new roof construction or can be easily retrofit into existing roof systems. The present invention further provides for solar energy control and harvesting in conjunction or combination with the baffle systems.

DISCLOSURE OF THE INVENTION

According to various features, characteristics and embodiments of the present invention which will become apparent as the description thereof proceeds, the present invention provides a baffle vent for positioning against the underside of a roof between adjacent roof rafters and defining an air flow passage between the baffle vent and an interior surface of the roof for directing air from a soffit area to the roof upwardly over the interior surface of the roof, the air flow passage having a first end with an opening below the roof for admitting air into the air flow passage and a second end with an opening longitudinally spaced from the first end, the baffle vent including:

an elongated self-supporting structure of sheet-like material having opposite longitudinal ends and opposite transverse sides and a continuously curved transverse cross-sectional shape that extends between and to the opposite sides, which continuously curved transverse cross-sectional shape is substantially uniform along a length of the baffle vent that extends between and to the opposite ends, the baffle vent being resiliently bend able in the direction of the curved transverse cross-sectional shape.

The present invention further provides a method of providing ventilation to a roofing system having rafters and roof sheeting on top of the rafters, the method involving:

providing a baffle vent having opposite longitudinal ends and opposite transverse sides and a continuously curved transverse cross-sectional shape that extends between and to the opposite sides;

resiliently bending the opposite transverse sides of the baffle vent together;

positioning the transverse sides of the baffle vent between adjacent ones of the rafters; and releasing the transverse side of the baffle vent so that the transverse sides resiliently expand outward and contact the adjacent rafters to hold the baffle vent in position between the adjacent rafters.

The present invention also provides a radiant collector system for roof constructions having rafters and roof sheeting on top of the rafters, which radiant collector system includes:

a plurality of baffle vents provided between adjacent ones of said rafters so as to form air flow passageways between the baffle vents and the roof sheeting;

positioning solar thermal collectors within the air flow passageways, said solar thermal collectors comprising pipes through which a heat-exchange fluid can flow; and coupling the solar thermal collectors to a solar thermal collector grid.

BRIEF DESCRIPTION OF DRAWINGS

The present invention will be described with reference to the attached drawings which are given as non-limiting examples only, in which.

BEST MODE FOR CARRYING OUT THE INVENTION

The present invention relates to the ventilation of attics and cathedral ceilings and to controlling the transfer of heat energy between the roof surface and the structure below, e.g. attic space or cathedral ceiling. More particularly, the present invention relates to a baffle system that can be used to provide ventilation to attics and roofs at the time of new roof construction or retrofit. The present invention further provides for the reduction of radiant heat transfer from the roof surface inward toward the structure below, including the attic and living space that might be
air conditioned in the summer, and also provides for the reduction of heat transfer from the living space and/or attic outward toward the roof surface in the winter. In addition, the present invention provides for the harvesting of solar thermal energy for solar heating systems, such as but not limited to, domestic water heating, in conjunction or in combination with the baffle systems.

According to one embodiment the baffle vents of the present invention are made from a resilient material and are designed and configured to be flexed into a deformed shape, positioned between adjacent roof rafters and released whereupon the baffle vents attempt to spring back into their original shape and become wedged between the adjacent roof rafters. The resultant arched geometry of the resilient material, held in an "arc" configuration by the adjacent roof rafters, resists collapse under the compressive force of the installed insulation materials. This embodiment of the present invention is particularly suitable for retrofitting the baffle vents into existing roof systems.

According to another embodiment the baffle vents have side edge portions that are configured to extend over the upper portions of roof rafters and thereby support the baffle vents between adjacent roof rafters. This embodiment of the present invention is particularly suitable for incorporating the baffle vents into roof systems at the time of construction.

The baffle vents of the present invention can function as radiant barriers while providing ventilation in a roof system. By providing the upper surface of the baffle vents with a reflecting coating or reflective surface, the baffle vents will reflect radiant energy and prevent heat transfer between the underlying structure or living space and the roof surface.

According to another embodiment of the present invention the baffle vents can be used to produce a solar radiant collector system. In this embodiment, solar thermal collectors are positioned in the air flow channels defined by the baffle vents. The solar thermal collector, which can be in the form of pipes or tubes through which a heat exchanging fluid can flow, are supported between the baffle vents and the roof sheeting. The solar thermal collectors are coupled to a solar grid that includes a heat exchanger and any conventional heating system, including systems for heating domestic water, dwelling heating systems, walkway and driveway heating systems, etc.

The solar thermal collectors can be supported by the baffle vents, roof rafters, roof sheeting or any convenient structure as discussed below.

The present invention will be described hereafter with reference to the attached drawings which depict non-limiting embodiments of the invention. Throughout the drawings common reference numerals have been used to identify similar elements of the invention when possible to simplify the disclosure.

Figure 1:
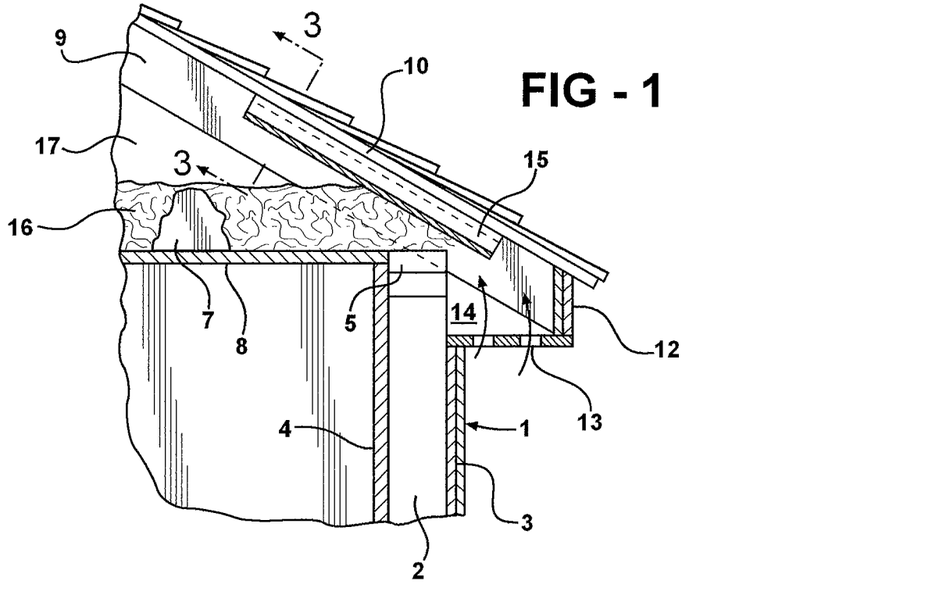
FIG. 1 is a fragmentary cross-sectional view of a portion of a frame building showing a baffle vent according to one embodiment of the present invention mounted at the intersection of an outside wall, attic joist and roof rafters.

FIG. 1 is a fragmentary cross-sectional view of a portion of a frame building showing an attic insulation vent according to one embodiment of the present invention mounted at the intersection of an outside wall, attic joist and roof rafters. As shown in FIG. 1 the building includes a wall 1 that comprises vertical studs 2, exterior wall sheeting 3, interior wall board 4, and a horizontal wall plate 5. Studs 2 and wall plate 5 are made of standard two-by-four construction lumber. Wall plate 5 as shown is, as usual, made up of a pair of two-by-fours. Attic ceiling joists 7 rest on top of and are attached to wall plate 5. Ceiling 8 is supported from the underside of ceiling joists 7. Ceiling 8 is gypsum board or any other ceiling material. Roof rafters 9 rest at an acute angle on wall plate 5. Roof rafters 9 are notched to fit the wall plate 5. Roof sheeting 10 is nailed to the top of roof rafters 9, and roofing 11 is nailed to the roof sheeting 10.

A fascia board 12 is nailed across the ends of roof rafters 9. A horizontal vented soffit 13 is mounted between fascia board 12 and wall sheeting 3. Fascia board 12, vented soffit 13 and roof sheeting 10 form an enclosed eave space 14. A baffle vent 15 according to one embodiment of the present invention is shown as being mounted between a pair of roof rafters 9. Bulk insulation 16 is blown or otherwise forced to fill the area between and above ceiling joists 7. The insulation 16 commonly is piled to a height above ceiling joists 7 and is shown contacting the underside of baffle vent 15. Ventilating air is allowed to flow in the path shown by arrows in FIG. 1. Outside air enters eave area 14 through vented soffit 13 and travels upward through baffle vent 15 into an open attic space 17. This open attic space 17 is commonly vented out the end of the attic wall (not shown) or elsewhere to allow an outward flow of air. In an alternative arrangement, the baffle vent 15 could extend at or near a vent provided at the ridge of the roof.

Figure 2:
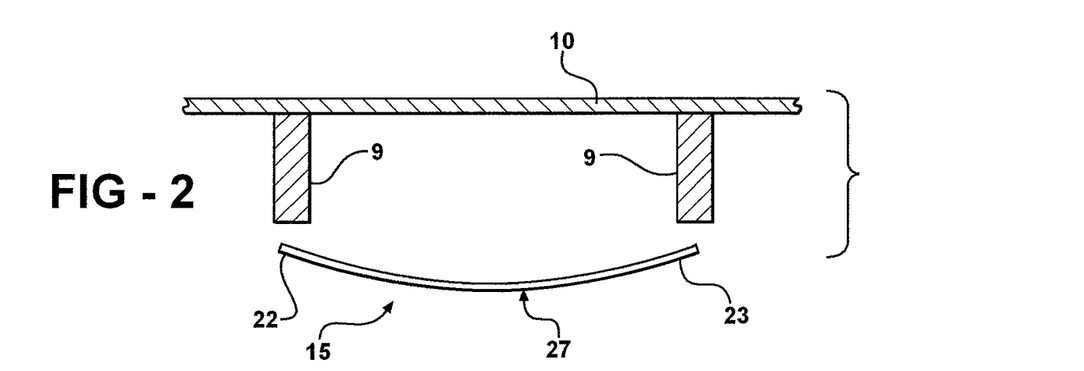
FIG. 2 is a cross-sectional view of a pair of adjacent roof rafters and sheeting, and a radiant baffle vent in a position prior to installation.
Figure 3:
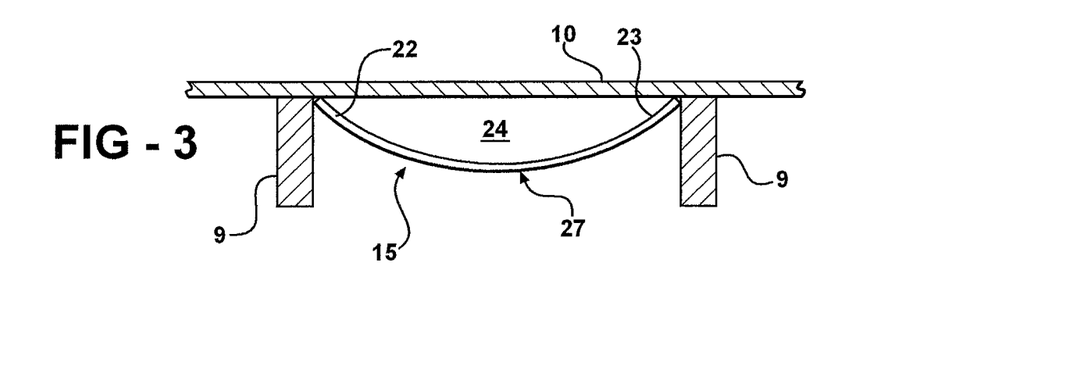
FIG. 3 is a cross-sectional view of a pair of adjacent roof rafters and sheeting showing the radiant baffle vent of FIG. 2 in its installed position taken along section lines 3-3.

FIGS. 2 and 3 are directed to an embodiment of the present invention which is particularly suitable for retrofitting the baffle vents into existing roof systems. FIG. 2 shows a baffle vent 15 in position for installation between a pair of roof rafters 9. To install the baffle vent 15, the sides 22 and 23 (or channel side walls 26) are bent inward so that sides 22 and 23 will fit in between the roof rafters 9. The baffle vent 15 is then moved upward between the roof rafters 9 to a position at which the sides 22 and 23 abut the lower surface of the roof sheeting 10. Once the sides 22 and 23 of the baffle vent 15 are released they move outward under the biasing force built up from bending the sides 22 and 23 inward, and press against the roof rafters 9 at or near the intersection of the roof rafters 9 and the roof sheeting 10. As a result, the tension created by biasing force built up from bending the sides 22 and 23 inward ho lds the sides 22 and 23 of the baffle vent 15 permanently in place as shown in FIG. 3.

The baffle vent 15 can include a reflective upper surface 18 or a reflective bottom surface, or both, so as to function as a radiant barrier that reflects radiant energy and prevents heat transfer into or from the underlying structure or living space. Further, the baffle vent 15 should be perforated or otherwise configured to allow for venting of moist air rising up from the underlying living space so as prevent the baffle vents 15 from functioning as vapor barriers. While providing the baffle vents 15 with a series, arrays or patterns of perforations is one manner of providing for the venting of moisture, it is also possible to configure the baffle vents 15 to allow for the venting of moist air rising up from the underlying living space. For example, as discussed below in reference to FIGS. 4A and 4B below, the sides of the baffle vents 15 could be provided with teeth, notches, pins or other nonlinear structures that forcefully engage the adjacent roof rafters 9 and more permanently secure the baffle vents 15 in the position shown in FIG. 3. These configurations can also provide for venting of moisture between the sides of the baffle vents 15 and the adjacent roof rafters 9. As an example, when baffle vents 15 having teeth or notches along their side edges are installed as shown in FIG. 3, the gaps provided between the teeth or notches and the adjacent roof rafters 9 will allow for venting of moist air rising up from the underlying living space. Absent providing for such venting of moist air rising up from the underlying living space can result in the accumulation of moisture with subsequent formation condensation and ice in winter months and undesirable water damage.

Suitable materials from which to make the baffle vents 15 includes metals such as aluminum, galvanized steel, stainless steel, copper, etc, plastic materials such as thermoplastics, composite materials, laminate materials, etc. The baffle vents 15 can be made from sheet-like materials or panels of materials. From FIGS. 2 and 3 it can be understood that suitable materials from which to make the baffle vents 15 include materials that are sufficiently rigid or semi-rigid
and able to be bent or curved and spring back from being bent or curved. As far as the requirement of being rigid or semi-rigid, the baffle vents 15 are required to be self-supporting in the position and embodiment shown in FIG. 3 and should further have sufficient mechanical strength to resist being adversely deformed if insulation is blown against or otherwise presses against the baffle vents 15 after they are installed.

Figure 4A:
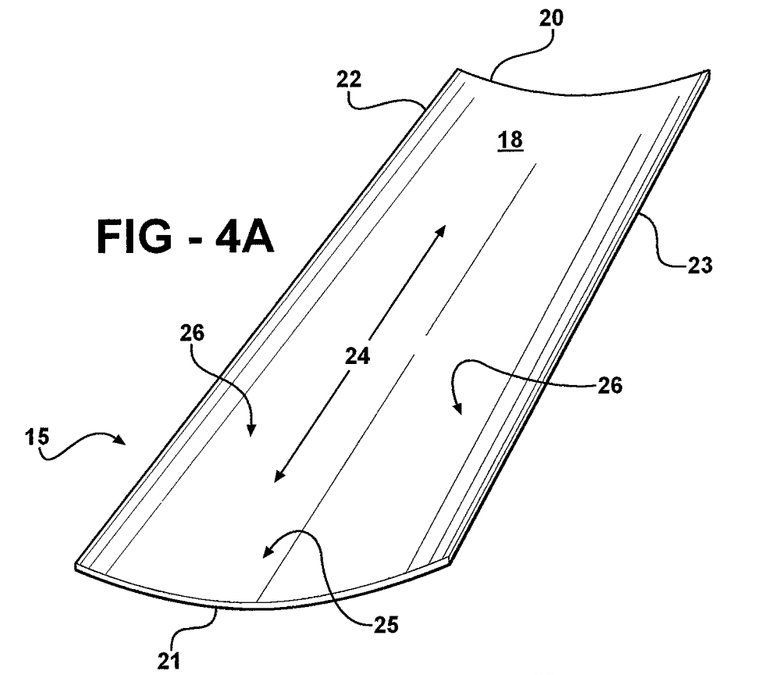
FIG. 4A is a perspective view of a baffle vent according to one embodiment of the present invention.

FIG. 4A is a perspective view of a baffle vent according to one embodiment of the present invention. As shown in FIG. 4A baffle vent 15 has a generally overall rectangular shape defined between opposite ends 20 and 21 and opposite sides 22 and 23. The baffle vent 15 has a curved shape as shown that defines a channel 24 having a bottom 25 and side walls 26 that slope upwards to the sides 22 and 23. As discussed below, the channel 24 provides an air flow space that allows ventilation of a roof system.

According to one embodiment of the present invention, the sides 22 and 23 of the baffle vents 15 are substantially linear or smooth as shown. This embodiment, or one in which the end portions of the sides 22 and 23 are beveled or tapered, will allow the baffle vents 15 to be installed between a pair of adjacent roof rafters 9 and then slid a distance between the roof rafters 9. Such an embodiment will allow for retrofitting of the baffle system into existing roof constructions which might have areas that are difficult to access.

Alternatively, the sides 22 and 23 of the baffle vents 15 could be provided with teeth, notches, pins or other nonlinear structures that forcefully engage the adjacent roof rafters 9 and more permanently secure the baffle vents 15 in the position shown in FIG. 3. As discussed above, configuring the sides 22 and 23 of the baffle vents 15 so as to have such nonlinear structures can also provide for venting of moist air rising up from the underlying living space.

The channels 24 of the baffle vents 15, after installed, can have circular or substantially circular shapes or non-circular shapes including geometric shapes (e.g., parabolic, hyperbolic, etc.) and non-geometric shapes, including any compound or otherwise continuous curve shape. The shape of the curved channels 24 can be selected as desired to provide a predetermined venting area between baffle vents 15 and roof sheeting 10.

Figure 4B:
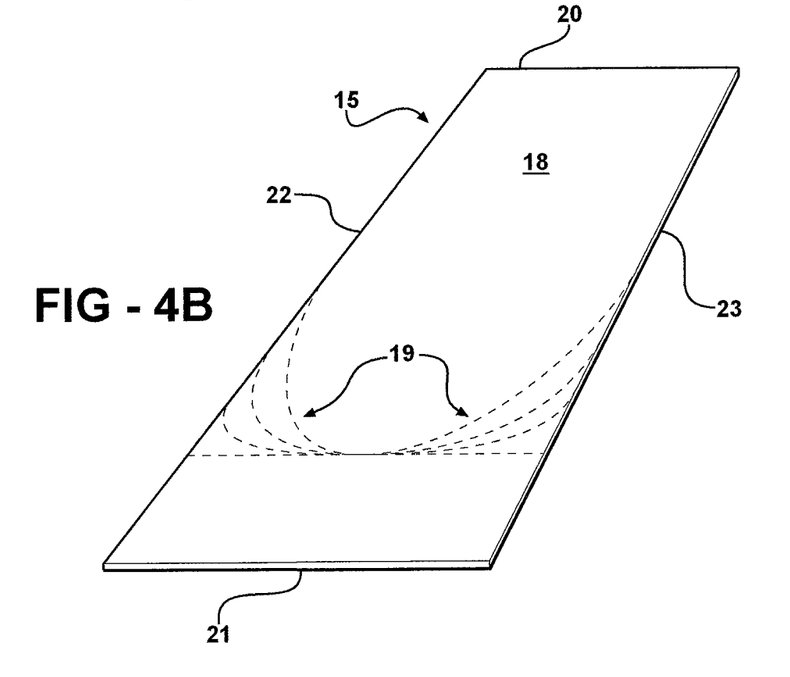
FIG. 4B is a perspective view of a baffle vent according to another embodiment of the present invention.

FIG. 4B is a perspective view of a baffle vent according to another embodiment of the present invention. The baffle vent 15 shown in FIG. 4A has a normal transverse cross-sectional shape that is slightly curved between the sides 22 and 23. According to another embodiment of the present invention which is depicted in FIG. 4B, the baffle vent 15 has a generally overall rectangular shape defined between opposite ends 20 and 21 and opposite sides 22 and 23. The baffle vent 15 of FIG. 4B does not have a curved shape as shown in the embodiment of the baffle vent 15 shown in FIG. 4A. Rather the baffle vent 15 shown in FIG. 4B has is substantially flat in its normal state, otherwise the baffle vent 15 shown in FIG. 4B can be configured and used in substantially the same manner as the baffle vent 15 shown in FIG. 4A. That is, the baffle vent 15 shown in FIG. 4B can be installed between pairs of adjacent roof rafters 9 by bending the sides 22 and 23 inward so that sides 22 and 23 will fit in between the roof rafters 9. The baffle vent 15 is then moved upward between the roof rafters 9 to a position at which the sides 22 and 23 abut the lower surface of the roof sheeting 10. Once the sides 22 and 23 of the baffle vent 15 are released they move outward under the biasing force built up from bending the sides 22 and 23 inward, and press against the roof rafters 9 at or near the intersection of the roof rafters 9 and the roof sheeting 10. The tension created by biasing force built up from bending the sides 22 and 23 inward holds the sides 22 and 23 of the baffle vent 15 permanently in place in the manner depicted in the embodiment of the invention shown in FIG. 3.

In the embodiment of the invention shown in FIG. 4B the channel which defines the air flow passage is formed when the sides 22 and 23 of the baffle vent 15 are held in a curved configuration between pairs of adjacent roof rafters 9. Further the baffle vent 15 shown in FIG. 4B (and FIG. 4A) can include a reflective upper surface 18, or lower surface, or both, so as to function as a radiant barrier that reflects radiant energy and prevents heat transfer into the underlying structure or living space. In addition, the baffle vent 15 should be perforated or otherwise configured, as discussed above, to allow for venting of moist air rising up from the underlying living space so as prevent the baffle vents 15 from functioning as vapor barriers.

Suitable materials from which to make the baffle vents 15 shown in FIG. 4B (and other embodiments of the present invention) include metals such as aluminum, galvanized steel, stainless steel, copper, etc, plastic materials such as thermoplastics, composite materials, laminate materials, etc. The baffle vents 15 can be made from sheet-like materials or panels of materials. From FIGS. 2 and 3 it can be understood that suitable materials from which to make the baffle vents 15 include materials that are sufficiently rigid or semi-rigid and able to be bent or curved and spring back from being bent or curved. As far as the requirement being rigid or semi-rigid, the baffle vents 15 are required to be self-supporting in the position and embodiment shown in FIG. 3 and should further have sufficient mechanical strength to resist being adversely deformed if insulation is blown against or otherwise presses against the baffle vents 15 after they are installed.

The baffle vents 15 shown in FIG. 4A are essentially pre-bent to have an initial curved cross-sectional shape. These baffle vents 15 can be stacked for shipping. In the embodiment of the invention shown in FIG. 4B, the baffle vents 15 could be provided in the form of a continuous roll of sheet material that is rolled out and cut to length on a job site. Such a roll of sheet materials from which to cut individual baffle vents to length could be provided in a suitable width for the resulting baffle vents 15 to fit between pairs of adjacent roof rafters 9 for a particular roof construction.

In practice, the embodiment of the baffle vents depicted in FIG. 4A could be provided in a suitable length that would be sufficient to provide a venting air flow passageway for air to enter an eave area through vented soffit and travel upward through baffle vent 15 into an open attic space. The embodiment of the baffle vents depicted in FIG. 4B, which can be any height, are particularly useful for providing an air flow passageway that extends from an eave area to a position at or near a vent provided at the ridge of the roof as for a cathedral ceiling application. It is to be understood that multiple sections of the baffle vents of FIG. 4A could be abutted together or overlapped to extend to any desired length. Also, the baffle vents of FIG. 4B could of course be cut to any length including short lengths that extend only between eave areas and open attic spaces.

The embodiment of the invention shown in FIG. 4B can include indicia 19 which, as explained in further detail provides a cutting guide for forming insulation dams.

Figure 5A:
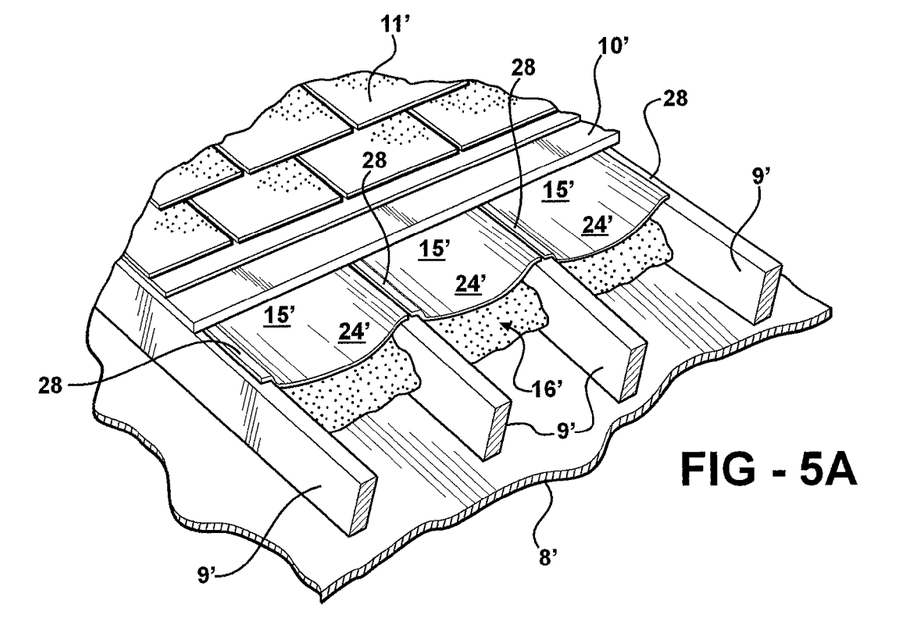
FIG. 5A is a fragmented perspective view illustrating the baffle vents according to another embodiment of the present invention incorporated into another type of roof construction.

FIG. 5A is a fragmented perspective view illustrating the baffle vents according to another embodiment of the present invention incorporated into another type of roof construction. The embodiment of the invention shown in FIG. 5A includes three baffle vents 15' that are installed side-by-side in a ceiling, roof construction. This type of construction involves providing a plurality of parallel roof rafters 9' and installing drywall panels or sheeting 8' against the bottom edges of the roof rafters 9'. Insulation 16' is then in installed between the roof rafters 9' as illustrated, the baffle vents 15' are installed on top of the roof rafters 9', and the roof sheeting 10' (e.g. plywood sheeting) is fastened over the baffle vents 15' together with a layer of roofing material such as shingles 11'.

The type of roof construction shown in FIG. 5A is used in manufactured housing. The ceiling/roof structure is often assembled or manufactured "inside-out" as discussed above.

In the embodiment of the present invention illustrated in FIG. 5A, the sides 22' and 23' of the baffle vents 15' are provided with flanges 28 that are configured to rest on the top edges of roof rafters 9' as shown in FIG. 5A. Such flanges 28 could be separately secured in place by mechanical fasteners such as nails, screws, etc. or otherwise held in position once the roof sheeting 10'.

As can be appreciated, the baffle vents 15' shown in FIG. 5A are not required to be friction- or press-fitted between adjacent roof rafters 9' as in the case of the baffle vents 15 shown in FIGS. 2 and 3. Accordingly, the width of the channel 24' in the baffle vents 15' shown in FIG. 5A is slightly smaller than the space between the adjacent roof rafters 9'. In contrast, in FIG. 2 the width of the channel 24 in the baffle vent 15 (before being bent) is the same as the space between the adjacent roof rafters 9.

It is to be understood that in an alternative embodiment to FIG. 5A, rather than use three separate baffle vents 15', a multiple channel baffle vent could be provided which is configured to extend over or across three or more adjacent roof rafters 9' and provide separate channel structures 24' between each pair of adjacent roof rafters 9'.

Figure 5B:
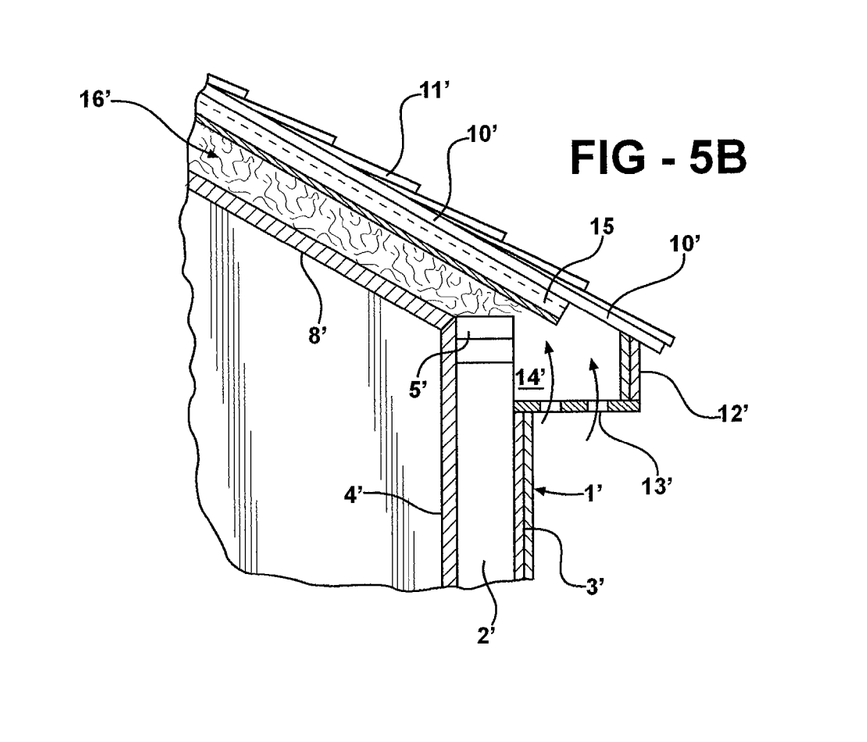
FIG. 5B is a fragmented perspective view illustrating the baffle vents according to another embodiment of the present invention incorporated into another type of roof construction.

FIG. 5B is a fragmented perspective view illustrating the baffle vents according to another embodiment of the present invention incorporated into another type of roof construction.

The roof construction shown in FIG. 5B includes a wall 1' that comprises vertical studs 2', exterior wall sheeting 3', interior wall board 4', and a horizontal wall plate 5'. Studs 2' and wall plate 5' are made of standard two-by-four construction lumber. Wall plate 5' as shown is, as usual, made up of a pair of two-by-fours. Roof rafters 9' rest on top of and are attached to wall plate 5'. Ceiling 8' is supported from the underside of roof rafters 9'. Ceiling 8' is gypsum board or any other ceiling material. Roof rafters 9' rest at an acute angle on wall plate 5'. Roof rafters 9' are notched to fit the wall plate 5'. Roof sheeting 10' is nailed to the top of roof rafters 9', and roofing 11' is nailed to the roof sheeting 10'.

A fascia board 12' is nailed across the ends of roof rafters 9'. A horizontal vented soffit 13' is mounted between fascia board 12' and wall sheeting 3', Fascia board 12', vented soffit 13' and roof sheeting 10' form an enclosed eave space 14'. A baffle vent 15' according to one embodiment of the present invention is shown as being mounted between a pair of roof rafters 9'. Bulk: insulation 16' is provided beneath baffle vents 15 and between adjacent pairs of roof rafters 9' and above ceiling 8'. Ventilating air enters eave area 14' through vented soffit 13' and travels upward through baffle vent 15' at or near a vent provided at the ridge of the roof. In this embodiment, the baffle vent 15' extends from the eave area 14' at or near a vent provided at the ridge of the roof.

The use of baffle vents having upper reflecting surfaces (either due to the inherent reflective properties of the material itself or due to applied surface finish treatment) according to the present invention provide radiant barriers in addition to providing for ventilation as discussed above. According to another aspect of the present invention, discussed below, the baffle vents are used to collect radiant energy for heating purposes.

Figure 6:
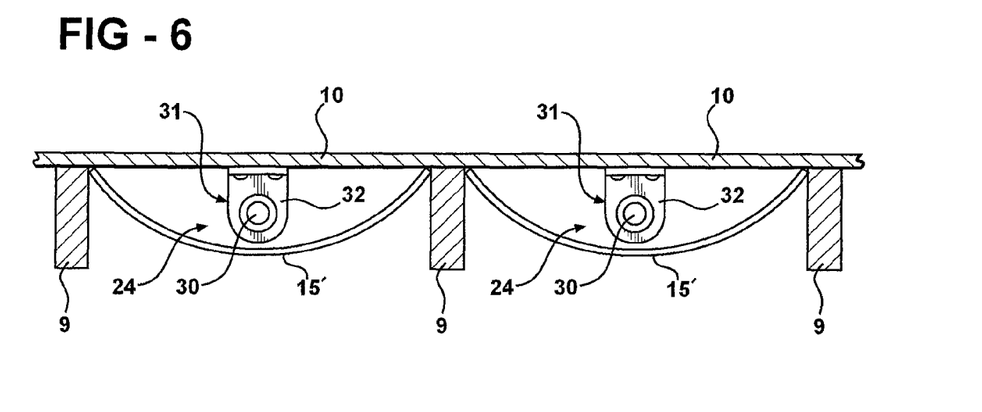
FIG. 6 is a cross-sectional view of a pair of adjacent roof rafters and sheeting with a baffle vent according to another embodiment of the present invention installed between the roof rafters.
Figure 7:
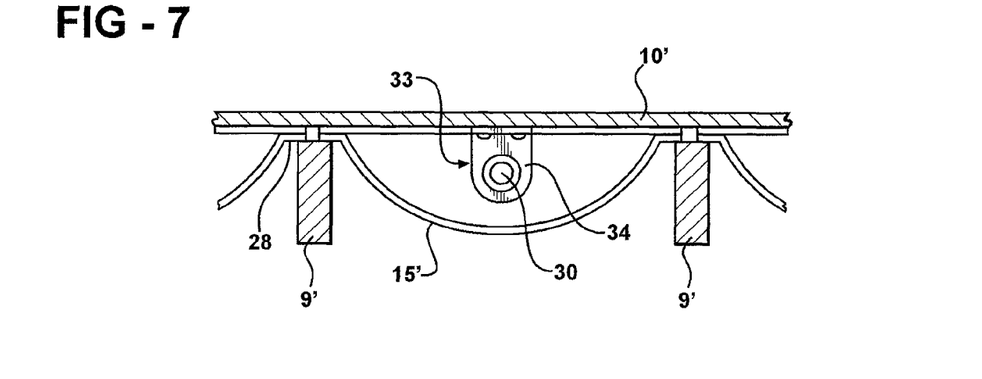
FIG. 7 is a cross-sectional view of a pair of adjacent roof rafters and sheeting with a baffle vent according to yet another embodiment of the present invention installed between the roof rafters.
Figure 8:
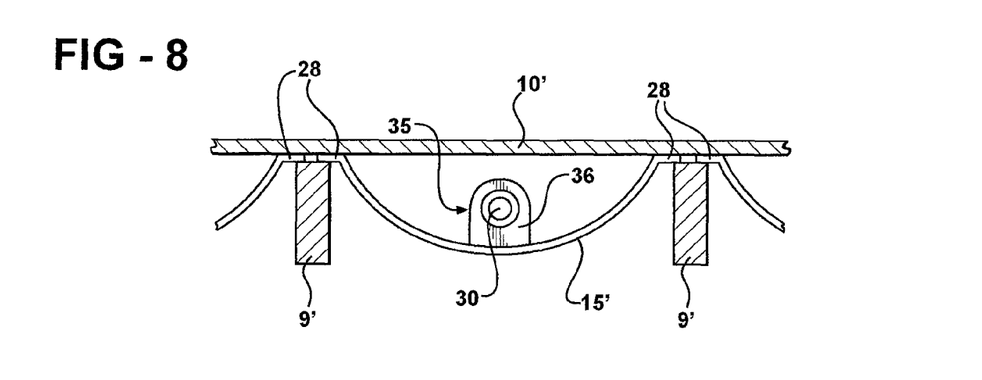
FIG. 8 is a cross-sectional view of a pair of adjacent roof rafters and sheeting with a baffle vent according to still another embodiment of the present invention installed between the roof rafters.

FIG. 6 is a cross-sectional view of a pair of adjacent roof rafters and sheeting with a baffle vent according to another embodiment of the present invention installed between the roof rafters. FIG. 7 is a cross-sectional view of a pair of adjacent roof rafters and sheeting with a baffle vent according to yet another embodiment of the present invention installed between the roof rafters. FIG. 8 is a cross-sectional view of a pair of adjacent roof rafters and sheeting with a baffle vent according to still another embodiment of the present invention installed between the roof rafters.

In each of FIGS. 6-8, a solar thermal collector 30 is provided in the channel 24' defined by the baffle vents 15 (15'). The solar thermal collectors 30 shown in each of FIGS. 6-8 are part of a collector grid which includes collector pipes or tubes that extend through some or all of the baffle vents 15 (15') in a roof system. A heat transfer fluid is circulated though the collector grid (and the solar thermal collectors 30 shown in FIGS. 6-8) to exchange heat with a building heating system, a water heating system, etc. in a conventional manner.

The solar thermal collectors 30 in each of FIGS. 6-8 are positioned within a central area of the channels 24 (24') defined by the baffle vents 15 (15'). In FIG. 6 the solar thermal collector 30 is supported by a bracket 31 that is coupled to the bottom of the roof sheeting 10 that extends over the top of channel 24. The bracket 31 in FIG. 6 is shown as having a single support leg 32 through which the solar thermal collector 30 can be received; however, the particular configuration or shape of the bracket 31 can vary as desired and can include more than one support legs and or a cradle or hook structure to receive solar thermal collector 30 or any other convenient configuration or arrangement. The embodiment of the invention shown in FIG. 6 is particularly suitable for retrofitting an existing roof with the baffle vents 15 and the solar thermal collectors 30. For example, the brackets 31 can be installed at the time that the roof sheeting 10 is installed for subsequent addition of the solar thermal collectors 30. Otherwise, the brackets 31 can be retrofitted in an existing roof together with the baffle vents 15 and the solar thermal collectors 30. The baffle vents 15 shown in FIG. 6 are similar to the baffle vents shown in FIGS.

4A and 4B which are designed to be fitted between adjacent pairs of roof rafters 9 by tension created by bending the sides of the baffle vents 15 together as discussed above.

In FIG. 7, the solar thermal collector 30 is shown as being supported by a bracket 33 that extends over the top of roof rafters 9'. The bracket 33 in FIG. 7 is shown as having a single support leg 34 through which the solar thermal collector 30 can be received; however, the particular configuration or shape of the bracket 33 can vary as desired and can include more than one support leg and or a cradle or hook structure to receive solar thermal collector 30 or any other convenient configuration or arrangement. The baffle vents 15' shown in FIG. 7 is similar to the baffle vent 15' shown in FIG. 5A and has side portions that extend over the top edges of roof rafters 9'. In the embodiment shown in FIG. 7 both the side edges of the support for the solar thermal collector 30 and the side edges of the baffle vent 15' are configured to rest on top of adjacent roof rafters 9' as shown. Alternatively, the side edges of the support for the solar thermal collector 30 and the side edges of the baffle vent 15' can be notched so that they both rest directly on the tops of adjacent roof rafters 9'.

In FIG. 8, the solar thermal collector 30 is shown as being supported by a bracket 35 that extends upward from the upper surface of baffle vent 15' which is configured to have side edges that rest on top portions of adjacent roof rafters 9'. The bracket 35 in FIG. 8 is shown as having a single support leg 36 through which the solar thermal collector 30 can be received; however, the particular configuration or shape of the bracket 35 can vary as desired and can include more than one support leg and or a cradle or hook structure to receive solar thermal collector 30 or any other convenient configuration or arrangement.

FIGS. 6-8 are merely non-limiting examples of how the solar thermal collectors 30 can be provided and position in the channels 24 (24') of the baffle vents 15 (15'). Other arrangements can be utilized, including providing two or more solar thermal collectors 30 in each channel 24 (24') or providing solar thermal collectors that have other than circular cross-sectional passageways or shapes. Moreover, the solar thermal collectors 30 do not have to be fixedly secured in the illustrated positions. Providing the solar thermal collectors 30 so that they merely rest on the support brackets rather than being fixed or secured to the support brackets will allow removal, repair and replacement of the solar thermal collectors 30 without having to remove excessive structural elements of the roofing system.

In order to improve the efficiency of the solar thermal collectors 30 shown in FIGS. 6-8 the lower surface of the roof sheeting 10 (10') can be blackened or darkened by applying a black or dark paint, coating, film, laminate, etc. Further, the curved cross-sectional shape of the channels 24 (24') of the baffle vents 15 (15') used in conjunction with the solar thermal collectors 30 can be configured so as to focus radiant heat towards the position where the solar thermal collectors 30 are provided. For example, the cross-sectional shape of the channels 24 (24') of the baffle vents 15 (15') can be parabolically shaped with the solar thermal collectors 30 positioned on the focal point of the parabolically shaped channels 24 (24').

The curved shape of the baffle vents of the present invention and the manner in which the sides of the baffle vents are attached of fixed against adjacent roof rafters provides a structural strength which can withstand pressures exerted on the undersides of the baffle vents by insulation that is provided beneath the baffle vents.

It is noted that while embodiments of the present invention have been described with reference to different types of roof constructions, the various embodiments are not limited or restricted to use in any particular type of roof construction. For example, the solar thermal collectors could be used in conjunction with the roof construction depicted in FIG. 1, 5A or 5B.

Further, the baffle vents could function as radiant baffles and radiant collectors by providing a reflective surface on their lower surfaces and solar thermal collectors in their channels.

Figure 9:
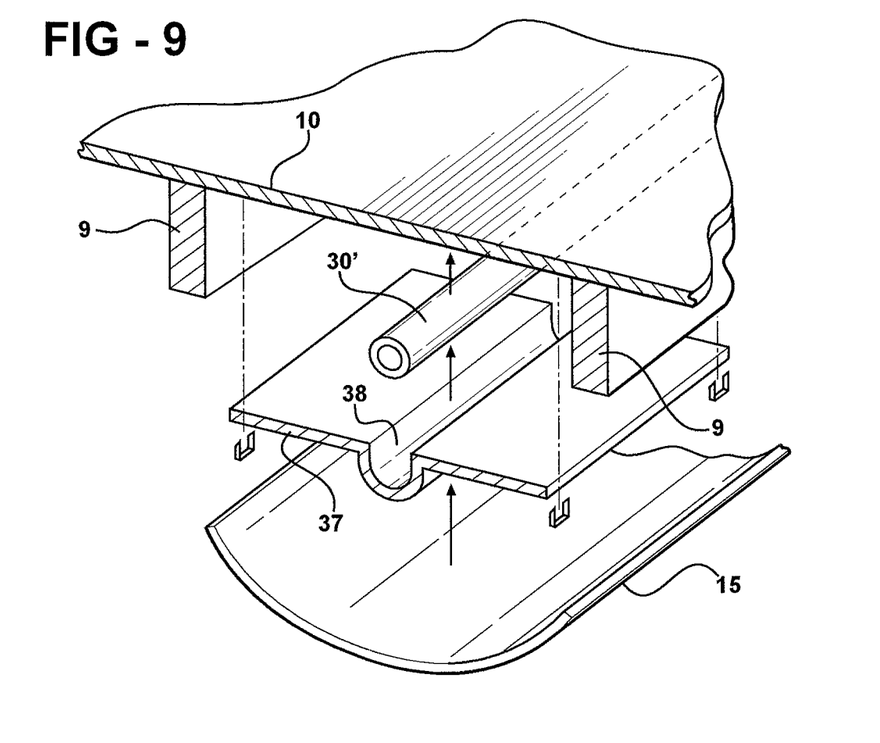
FIG. 9 is an exploded view of a radiant energy collector assembly according to one embodiment of the present invention.
Figure 10:
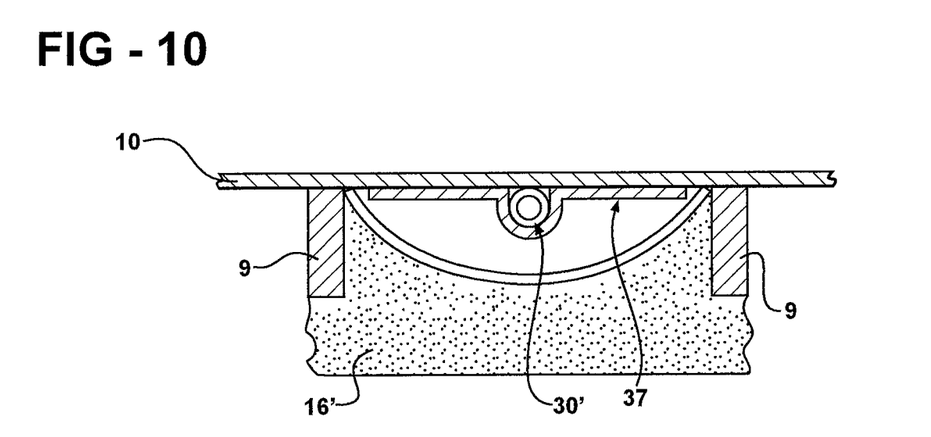
FIG. 10 is a cross-sectional view of a radiant energy collector assembly of FIG. 9.

FIG. 9 is an exploded view of a radiant collector assembly according to one embodiment of the present invention. Figure to is a cross-sectional view of the radiant collector assembly of FIG. 9. The embodiment of the invention shown in FIG. 9 and to includes a solar thermal collector 30' that is received in a heat transfer plate 37. The heat transfer plate 37 includes a channel 38 into which the solar thermal collector 30' is received, so that once received in channel 38 the upper surface of the solar thermal collector 30' is within or coplanar with or below the plane containing the upper surface of the heat transfer plate 37. In this configuration, the heat transfer plate 37 can be secured to the lower surface of roof sheeting 10 as shown in FIG. 10. The heat transfer plate 37 is made from a heat conducting material such as a metal or metal impregnated plastics or resins that preferably has a flat black finish that will allow for thermal heat absorption. In this embodiment, the lower surface of the roof sheeting to' is preferably provided with a flat back finish for thermal heat radiation. The heat transfer plate 37 can be attached to the lower surface of the roof sheeting 10' by any suitable mechanical fasteners, including nails, staples, screws, etc. The heat transfer plate 37 can be any suitable length, including substantially the entire length of the corresponding roof rafters 9'. Further, the heat transfer plate 37 can have any desired width up to the distance between adjacent roof rafters 9'. A single heat transfer plate 37 could be used or multiple abutting heat transfer plates 37 could be used between any pair of adjacent roof rafters 9'. As shown, the baffle vents 15 (15') discussed above can be used in conjunction with the heat transfer plates 37 of FIGS. 9 and 10. Insulation 16' as shown in FIG. 10 can be provided beneath baffle vent 15 as discussed herein in other embodiments of the present invention.

The embodiment of the invention shown in FIGS. 9 and 10 provides for both radiant heat collection and conductive heat thermal transfer for collecting heat in solar thermal collectors 30'. The radiant heat collection is provided by the baffle vents 15 and the conductive thermal transfer is provided by the heat transfer plates 37 which transfer heat from the roof sheeting 10 which can be significant especially when a dark roofing material such as black shingles are used.

Figure 11:
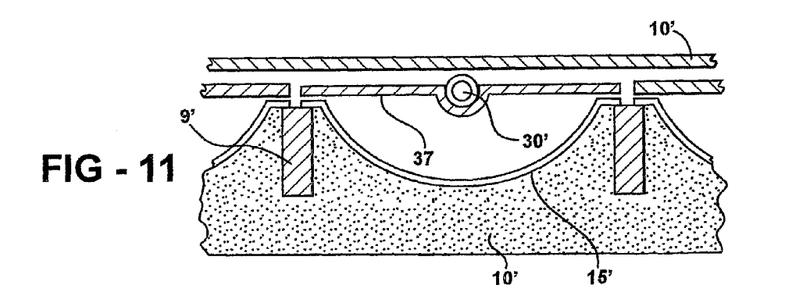
FIG. 11 is a cross-sectional view of a radiant energy collector assembly according to still another embodiment of the present invention.

FIG. 11 is a cross-sectional view of a radiant collector assembly according to still another embodiment of the present invention. FIG. 11 depicts an embodiment of the present invention that utilizes heat transfer plates 37 that can be installed during new roof construction. In this embodiment, both the side edges of the heat transfer plate 37 and the side edges of the baffle vent 15' are configured to rest on top of adjacent roof rafters 9' as shown. Alternatively the side edges of the heat transfer plate 37 and the side edges of the baffle vent 15' can be notched so that they both rest directly on the tops of adjacent roof rafters 9'. Insulation 16' is shown beneath baffle vent 16' in FIG. 11. It is to be understood that in the case of new roof construction the heat transfer plate 37 and/or the baffle vent 15' could be configured to extend across three or more roof rafters 9' if desired.

In a further embodiment, two or more channels 38 can be provided in the heat transfer plates 37 for receiving two or more solar thermal collectors 30'. Such alternatives will allow for a looped distribution or serpentine flow of heat-exchange within each individual baffle vent 15 (15').

Figure 12:
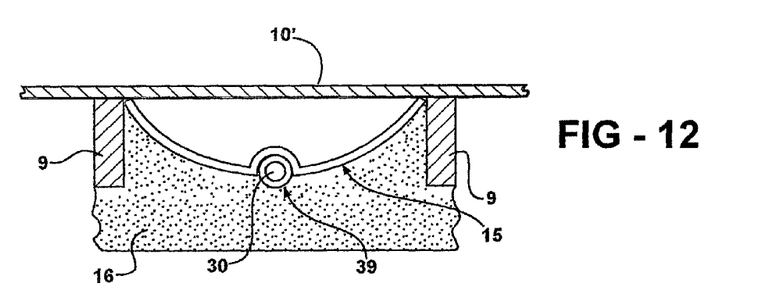
FIG. 12 is a cross-sectional view of a radiant energy collector assembly according to yet another embodiment of the present invention.

FIG. 12 is a cross-sectional view of a radiant collector assembly according to yet another embodiment of the present invention. In the embodiment of the invention shown in FIG. 12, the bottom of the baffle vent 15 is provided with a channel 39 into which a solar thermal collector 30 can be press-fit, fiction-fit or snap-fit. This embodiment will allow heat transfer to heat a heat-exchange fluid flowing through the solar thermal collector 30.

In addition to providing vent chutes for purposes of ventilation in roof systems, it is also know to provide insulation dams which prevent insulation from spilling into eave spaces or areas when such spilled or spilled-over insulation can block air flow from even entering vent chutes. Such insulation dams are typically installed between the lower end portions of adjacent roof rafters.

Figure 13A:
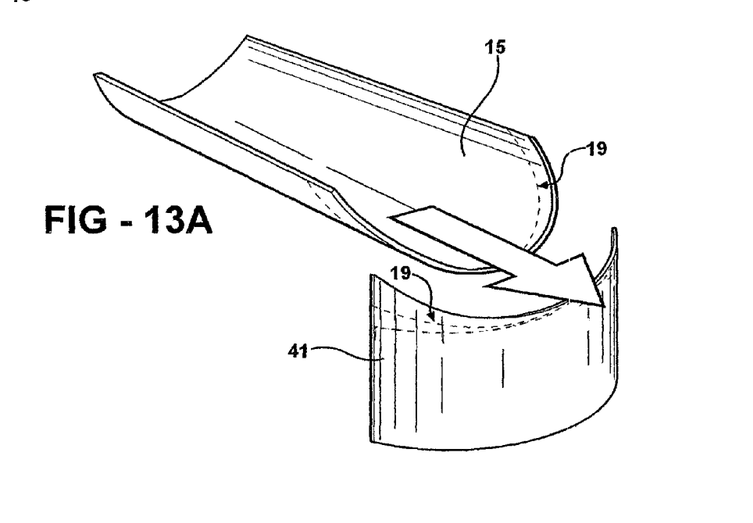
FIGS. 13A and 13B are perspective views depicting how the baffle vents can be configured to include insulation darns according to one embodiment of the present invention.
Figure 13B:
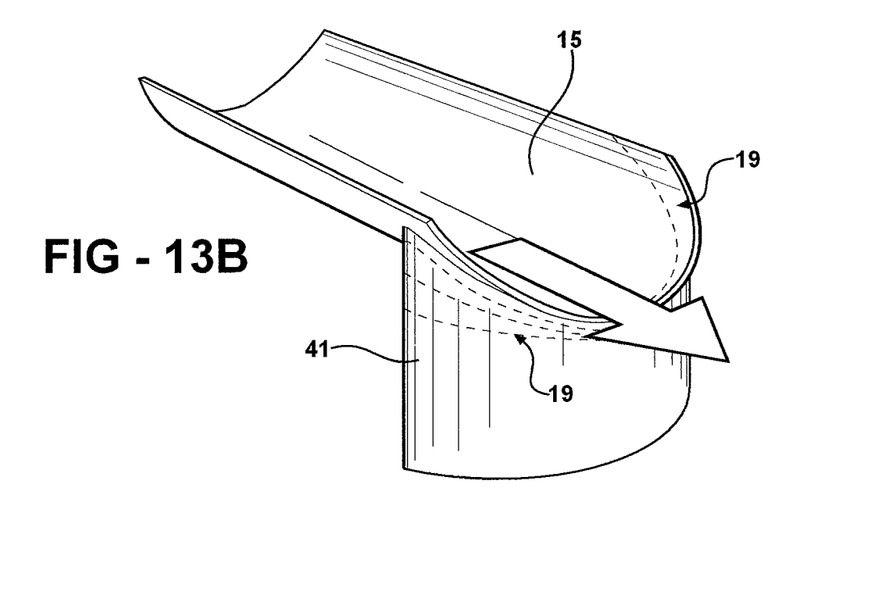

FIGS. 13A and 13B are perspective views depicting how the baffle vents can be configured to include insulation dams according to one embodiment of the present invention. According to one embodiment of the present invention the baffle vents 15 (15') can be provided with ends that are designed to be cut so as to form insulation dams. Provisions, such as the indicia 19 shown in FIG. 4B, can be provided which allow someone installing the baffle vents 15 (15') to form an insulation dam 41 from an end portion of the baffle vent stock. The indicia 19 can include multiple guide lines which correspond to progressively different roof pitches. Someone installing the baffle vents 15 (15') determines the pitch of the roof and cuts along appropriate curved lines shown in the indicia 19 of FIG. 4B. A complete cutting of the baffle vent stock results in two structural elements including the baffle vent 15 (15') and insulation dam 41 shown in FIG. 13A. The insulation dam 41 can be installed between lower end portions of adjacent roof rafter (not shown) in a conventional manner and the baffle vent 15 (5') can be moved toward the installed insulation dam (in the directed of arrow "a" in FIG. 13A), until the baffle vent 15 (15') and insulation dam 41 are aligned and position as shown in FIG. 13B.

Figure 14:
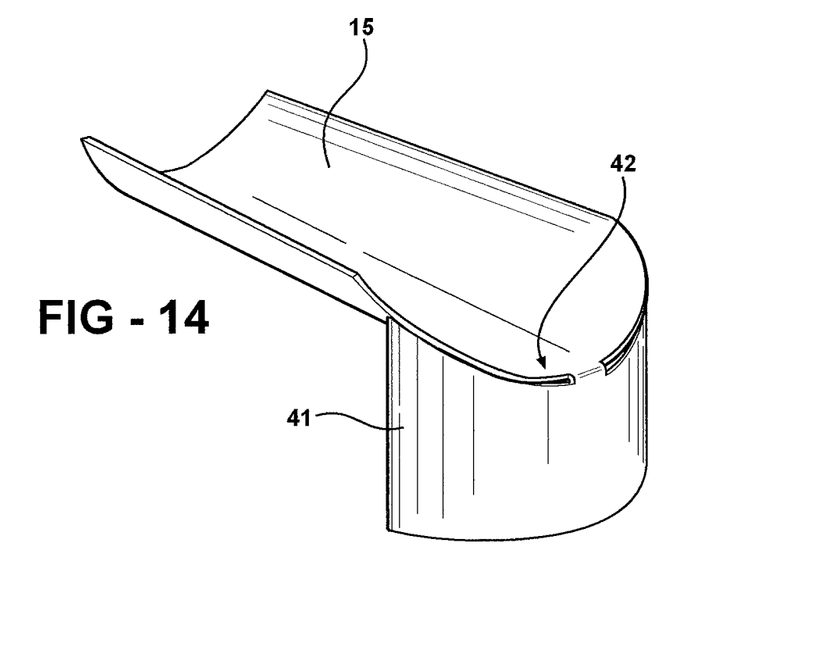
FIG. 14 is a perspective view depicting how the baffle vents can be configured to include insulation darns according to one embodiment of the present invention.

FIG. 14 is a perspective view depicting how the baffle vents can be configured to include insulation dams according to one embodiment of the present invention. In the embodiment of the invention shown in FIG. 14, the insulation dam 41 is not cut completely off from the end of the baffle vent 15 (15'). As shown a central portion 42 of the baffle vent 15 (15') insulation dam 41 remains intact. In this embodiment, the insulation dam 41 is allowed to extent downward as the baffle vent 15 (15') is positioned between adjacent pairs of roof rafters (not shown) so that the baffle vent 15 (15') and insulation dam 41 are aligned and position as shown in FIG. 14. In the case when the baffle vent might be slid between two adjacent roof rafters towards the end portions thereof, the downward extending baffle vent will contact the roof rafters and/or subadjacent structure and become aligned in a proper position to prevent insulation from spilling into the respective eave area or space.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and as set forth in the attached claim.

What is claimed is:

1. A method of providing ventilation to a roofing system having rafters and roof sheeting on top of the rafters, the method comprising:
   providing a baffle vent consisting of an elongated self-supporting structure consisting of sheet material having opposite longitudinal ends and opposite transverse side edges and an upper and a lower surface, wherein: the baffle vent is self-supporting by flexing the opposite transverse side edges upward and against adjacent roof rafters such that the baffle vent stays in place without the use of mechanical fasteners; the upper and lower surfaces of the baffle vent is uncovered and exposed when the baffle vent is self-supported to adjacent roof rafters; the baffle vent has a cross-sectional shape that extends to and between the transverse opposite side edges that is continuously concave upwards in a direction from the lower surface of the baffle vent toward the upper surface of the baffle vent; and at least one of the upper and lower surfaces of the baffle vent is reflective;
   resiliently bending the opposite transverse sides of the baffle vent together;
   positioning the transverse sides of the baffle vent between adjacent ones of the rafters; and
   releasing the transverse side of the baffle vent so that the transverse sides resiliently expand outward and contact the adjacent rafters along where the rafters intersect the roof sheeting to hold the baffle vent in position between the adjacent rafters without the use of mechanical fasteners.

2. A method of providing ventilation to a roofing system according to claim 1, wherein the baffle vent has a substantially uniform radius of curvature.

3. A method of providing ventilation to a roofing system according to claim 1, wherein the baffle vent has a non-uniform radius of curvature.

4. A method of providing ventilation to a roofing system according to claim 1, further comprising providing a solar thermal collector within an air flow passageway defined between the baffle vent and the roof sheeting, said solar thermal collector comprising a pipe through which a heat-exchange fluid can flow.

5. A method of providing ventilation to a roofing system according to claim 4, wherein a lower surface of the roof sheeting is a dark color that emits radiant heat.

6. A method of providing ventilation to a roofing system according to claim 1, further comprising cutting an end of the baffle vent to produce an insulation dam and positioning the insulation dam between adjacent ones of the rafters.

7. A method of providing ventilation to a roofing system according to claim 6, wherein the end of the baffle vent is provided with cutting indicia which corresponds to the pitch of a roof.

8. A method of providing ventilation to a roofing system according to claim 7, wherein the end of the baffle vent is cut so that the insulation dam is separated from the baffle vent.

9. A radiant collector system for roof constructions having rafters and roof sheeting on top of the rafters, which radiant collector system comprises:
   a plurality of baffle vents each one of said plurality of baffle vents consisting of an elongated self-supporting structure consisting of sheet material having opposite longitudinal ends and opposite transverse side edges and an upper and a lower surface, wherein: the baffle vents are self-supporting by flexing the opposite transverse side edges upward and against adjacent roof rafters such that the baffle vents stay in place without the use of mechanical fasteners; the upper and lower surfaces of the baffle vents are uncovered and exposed when the baffle vents are self-supported to adjacent roof rafters; the baffle vents have a cross-sectional shape that extends to and between the transverse opposite side edges that is continuously concave upwards in a direction from the lower surface of the baffle vents toward the upper surface of the baffle vents; and at least one of the upper and lower surfaces of the baffle vent is reflective and one of each plurality of baffle vents are secured provided between adjacent ones of said rafters along where the rafters intersect the roof sheeting without the use of mechanical fasteners so as to form air flow passageways between the baffle vents and the roof sheeting;
   solar thermal collectors positioned within the air flow passageways, said solar thermal collectors comprising pipes through which a heat-exchange fluid can flow; and
   the solar thermal collectors being coupled to a solar thermal collector grid.

10. A radiant collector system for roof constructions according to claim 9, wherein the plurality of baffle vents are held by friction between adjacent ones of the rafters.

11. A radiant collector system for roof constructions having rafters and roof sheeting on top of the rafters, which radiant collector system comprises:
   a plurality of baffle vents each one of said plurality of baffle vents consisting of an elongated self-supporting structure consisting of sheet material having opposite longitudinal ends and opposite transverse side flanges and an upper and a lower surface, wherein: the baffle vents are self-supporting such that when coupled to roof rafters the baffle vents stay in place without the use of mechanical fasteners extending therethrough; the upper and lower surfaces of the baffle vents are uncovered and exposed when the baffle vents are self-supported to adjacent roof rafters; the baffle vents have a cross-sectional shape that extends to and between the transverse opposite side flanges that is continuously concave upwards in a direction from the lower surface of the baffle vents toward the upper surface of the baffle vents; and at least one of the upper and lower surfaces of the baffle vent is reflective and one of each plurality of baffle vents are secured between adjacent ones of said rafters without the use of mechanical fasteners therethrough so as to form air flow passageways between the baffle vents and the roof sheeting;
   solar thermal collectors positioned within the air flow passageways, said solar thermal collectors comprising pipes through which a heat-exchange fluid can flow; and
   the solar thermal collectors being coupled to a solar thermal collector grid,
   wherein the transverse opposite side flanges extend over top portions of adjacent ones of the rafters.

12. A radiant collector system for roof constructions according to claim 11, wherein the solar thermal collectors are supported by the plurality of baffle vents.

13. A radiant collector system for roof constructions according to claim 9, wherein the solar thermal collectors are supported by the roof sheeting.

14. A radiant collector system for roof constructions according to claim 9, wherein the solar thermal collectors are supported by the rafters.

15. A radiant collector system for roof constructions according to claim 9, wherein the solar thermal collectors are supported by heat transfer plates that have substantially flat upper surfaces that are secured to a lower surface of the roof sheeting.

16. A radiant collector system for roof constructions according to claim 15, wherein the heat transfer plates have at least one channel into which solar thermal collectors are received.

17. A radiant collector system for roof constructions according to claim 11, wherein the solar thermal collectors are supported by the roof sheeting.

18. A radiant collector system for roof constructions according to claim 11, wherein the solar thermal collectors are supported by the rafters.

\* \* \* \* \*